United States Patent [19]
Schnaitter et al.

[11] Patent Number: 5,638,090
[45] Date of Patent: Jun. 10, 1997

[54] WINDOW-DEPENDENT BRIGHTNESS/TINT CONTROL FOR VIDEO DIGITAL-TO-ANALOG CONVERTERS

[75] Inventors: William N. Schnaitter, San Ramon; Spencer H. Greene, Palo Alto; Andrew Daniel, San Jose, all of Calif.

[73] Assignee: Alliance Semiconductor Corporation, San Jose, Calif.

[21] Appl. No.: 347,720

[22] Filed: Dec. 1, 1994

[51] Int. Cl.$^6$ ............................... G09G 5/14; G09G 5/04
[52] U.S. Cl. ........................................... 345/119; 345/153
[58] Field of Search ................. 345/113–116, 118–120, 345/150, 153, 155, 211

[56] References Cited

U.S. PATENT DOCUMENTS

| | | |
|---|---|---|
| 4,855,831 | 8/1989 | Miyamoto et al. ............... 345/113 |
| 5,442,379 | 8/1995 | Bruce et al. ..................... 345/153 |

Primary Examiner—Jeffery Brier
Attorney, Agent, or Firm—Limbach & Limbach L.L.P.

[57] ABSTRACT

A display control circuit controls the outputs of the three video DACs of an RGB monitor on a window-to-window basis to enable the display of motion video and text on the same screen with different brightness and/or tint. A digital overdrive signal, synchronized to the video DAC digital inputs, is used to enable added DAC elements for the pixels in the video windows only. Stored digital instructions determine how many and which added DAC elements are enabled by the overdrive bit(s). By storing different instructions for each of the three video DACs, the circuit may also provide window-dependent tint control. By increasing the number of bits of digital data synchronized to the digital DAC inputs, the stored instructions may be reduced or eliminated. In this case, each of several windows may be set to differing brightness and tint levels. As many different values of brightness and tint may be available as desired by increasing the number of synchronized input enabling bits and the number and strength of the added DAC elements.

16 Claims, 4 Drawing Sheets

WINDOW-DEPENDENT BRIGHTNESS/TINT CONTROL FOR VIDEO DIGITAL-TO-ANALOG CONVERTERS

BACKGROUND OF THE INVENTION

1. Field of the Invention

The present invention relates to visual display systems and, in particular, to circuitry for controlling brightness and tint in a RGB monitor on a window-by-window basis. The invention enables the display of motion video and text on the same screen with different brightness and/or tint.

2. Discussion of the Prior Art

A computer display uses a red-green-blue (RGB) monitor that is optimized for clarity so that small text fonts on the screen are easy to read. Distinct colors are few and gradual shading is not needed.

Motion video signals are typically encoded as YCrCb (Luminance, Chrominance-red, Chrominance-blue) so that greater bandwidth can be dedicated to brightness. In a typical video image, brightness will usually vary much more rapidly than color. Far more colors are used to provide realistic shading and variations in color.

When an ordinary television screen is used for computer display, the contrast is typically too high, reducing sharpness and making text difficult to read. Conversely, when digitized video is displayed on a RGB monitor, the image appears dull because brightness and contrast are lower than on a television screen.

Typically, three video digital-to-analog converters (DACs) are used to drive the display of multiple windows on a RGB monitor. A video DAC may consist of several elements which must be carefully controlled to maintain constant analog output for a given digital input code. The digital input code may consist of several bits which change in synchronism. For example, an eight-bit video DAC will receive an eight-bit digital input code to control 255 identical current sources or other devices with commonly-connected outputs. The digital input code determines which and how many of the current sources are enabled. That is, the output of the video DAC will vary from zero current, with none of the current sources enabled, to full scale, a current equal to 255 times the output current of one source, when all current sources are enabled. This output may vary incrementally by the current of one source for the 256 possible values of the binary eight-bit digital input code. The output of the video DAC is resistively terminated to a common ground node and connected to one of the three (RGB) inputs to the monitor. Identical DACs drive the other two monitor inputs.

In a RGB monitor, brightness is controlled by applying a DC offset equally to all three video DAC analog output lines. Tint variation is obtained by applying a DC offset unequally to the three lines. Previously, no variation has been used in the video DAC outputs to provide brightness and tint level variation on a window-to-window basis. The overall screen has been set to optimize for one window of interest. However, in a "windowed" environment, desktop graphics windows require optimization for brightness and clarity that is different from that needed for video windows. Thus, some windows have suffered if the brightness and tint levels were inappropriate for those windows.

Therefore, it would be highly desirable to have available circuitry for controlling the brightness and tint of a display on a window-by-window basis.

SUMMARY OF THE INVENTION

The present invention provides a display control circuit that controls the outputs of the video DACs of a RGB monitor on a window-by-window basis to enable the display of motion video and text on the same screen with different brightness and/or tint.

In accordance with an embodiment of the invention, a network of additional DAC elements is provided for each video DAC. The output of the added DAC elements network is connected in common with the output of the video DAC. The enabling inputs to the added DAC elements are connected to the outputs of a logic block that reads instructions stored in a register or other device. These instructions determine how much the video DAC output intensity is to be increased by determining how many and which of the added DAC elements are enabled by a window-dependent synchronous overdrive signal. When the overdrive signal is enabling, the logic block acts to enable the added DAC elements in accordance with the stored instructions. The enabling inputs from the logic block to the added DAC elements maintain synchronism with the other video DAC digital inputs. In this way, every pixel in an all "video" window has the video DAC output intensity level elevated by a common offset relative to the other windows on the display.

Other features, embodiments and advantages of the present invention will become apparent and be appreciated by reference to the following detailed description which should be considered in conjunction with the accompanying drawings.

A BRIEF DESCRIPTION OF THE DRAWINGS

Figure 4:
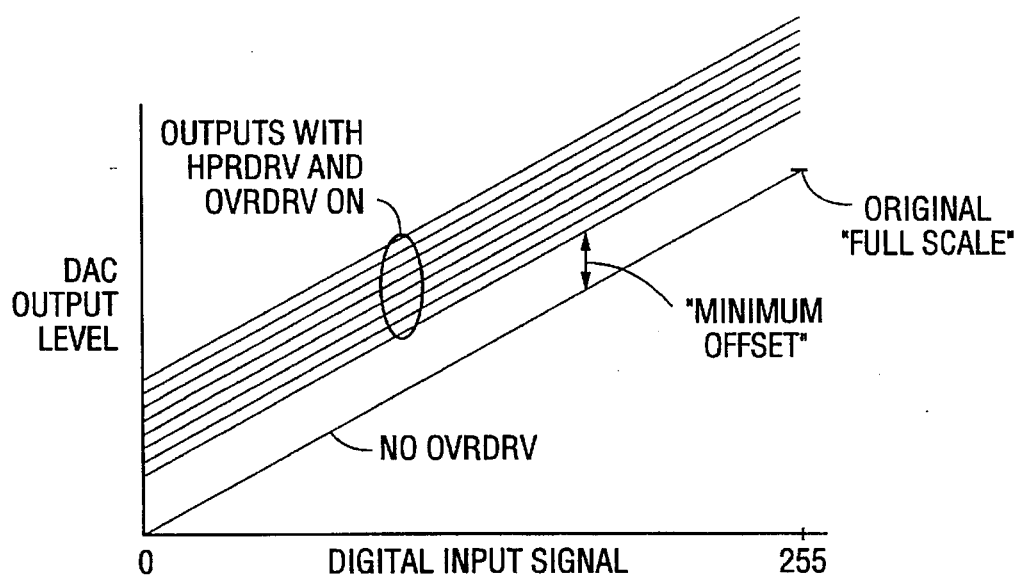

FIG. 4 plots video DAC behavior for an embodiment of the invention.

Figure 5:
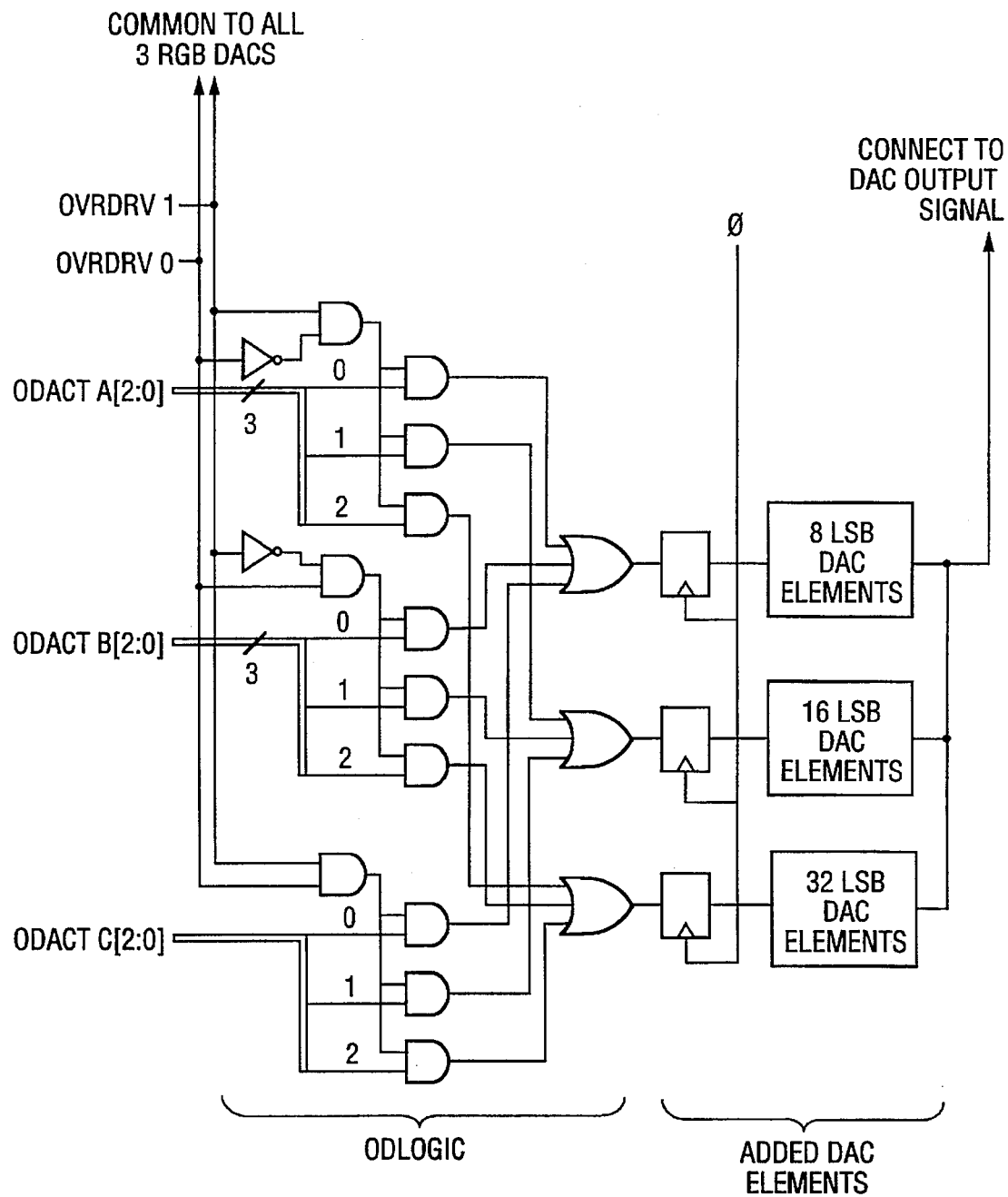

FIG. 5 is a schematic diagram illustrating an embodiment of the invention that utilizes multiple levels of enhanced brightness and tint.

Figure 6:
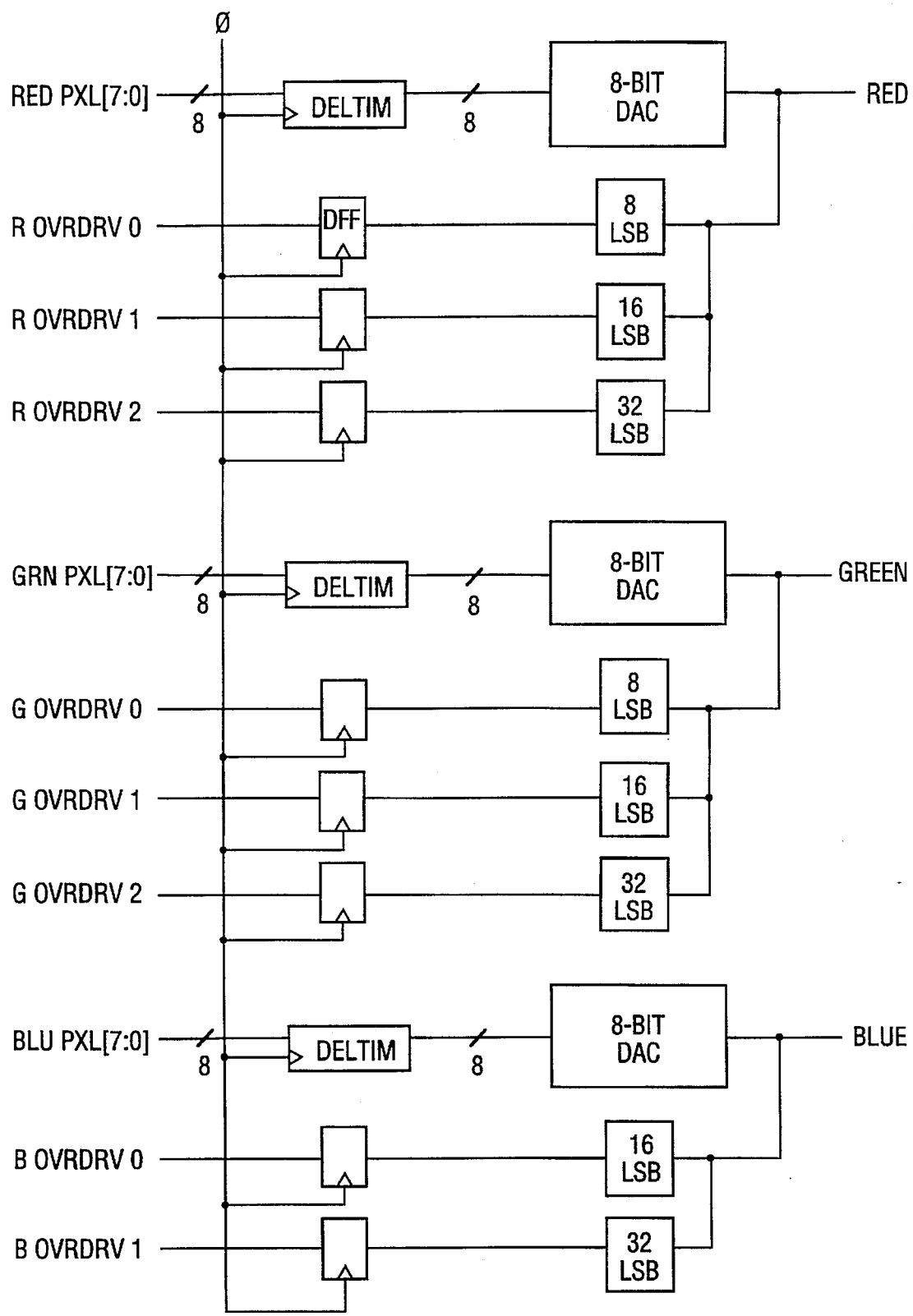

FIG. 6 is a schematic diagram illustrating an "all pixel-rate" embodiment of the invention.

DETAILED DESCRIPTION OF THE INVENTION

Figure 1:
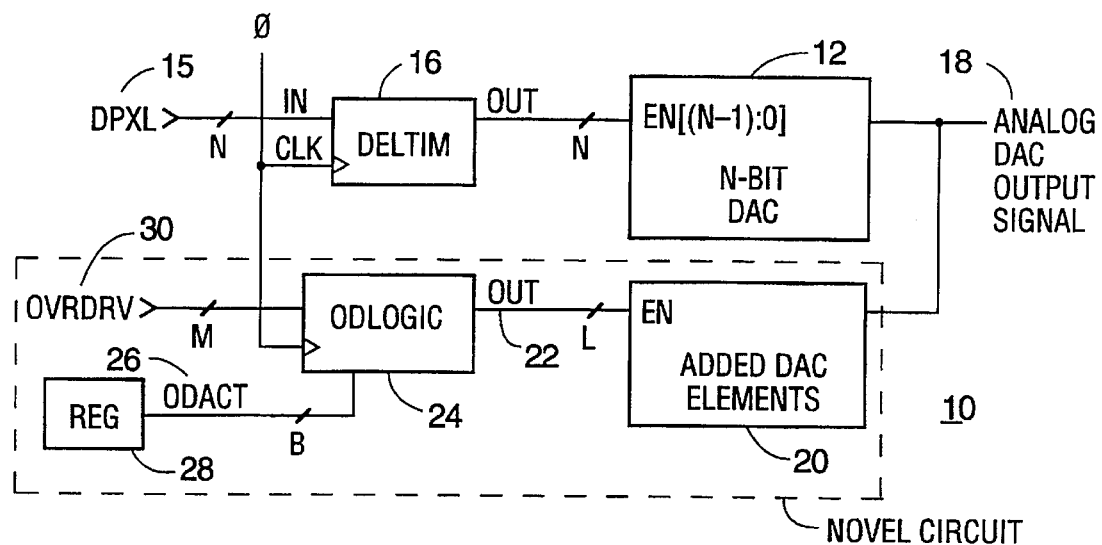
FIG. 1 is a block diagram illustrating the key elements of a display control circuit in accordance with the present invention.

FIG. 1 shows display control circuitry 10 associated with one of the three video DACs of a RGB monitor. Those skilled in the art will appreciate that each of the three video DACs associated with the monitor will have an associated display control circuit 10. In accordance with an embodiment of the present invention, the brightness of the RGB monitor can be increased by adding more current source elements 20 to boost the output current of the system's video DACs 12 above full scale. The additional DAC current source elements 20 are enabled by an overdrive signal that is synchronous to the video DAC inputs. By enabling these added DAC elements 20 on a window-by-window basis (pixel-to-pixel), one window on the display can be made brighter than another. In addition, if each of the three (RGB) video DACs 12 are individually controlled to enable the added DAC elements 20 independently, one window can have a different tint than another.

As shown in FIG. 1, each of the three conventional RGB n-bit video DACs 12 of the RGB monitor is driven by a digital input signal (dpxl) 15. The dpxl signals 15 are created by the graphics section of the computer in various well-known ways. The dpxl signal 15 has one n-bit value for each pixel on the display monitor; this is also one n-bit value for each cycle of the clock φ. The signal dxpl 15 is clocked into a buffer DELTIM 16 by clock signal φ and then clocked out of the buffer 16 to the video DAC 12. The video DAC 12 responds by providing a corresponding analog output signal 18.

In accordance with the invention, the outputs of the added DAC elements 20 are connected in common with the video DAC outputs. The 1-bit enabling input signal 22 is generated by a logic block ODLOGIC 24 that responds to instructions odact 26 stored in an instruction register 28 or other storage element. The instructions 26 determine how much the output intensity of the video DAC 12 is to be increased by defining how many and which of the new DAC elements 20 are enabled by a window-dependent synchronous overdrive signal ovrdrv 30. When the multi-bit overdrive signal 30 is enabling, the logic block 24 acts to enable the added DAC elements 20 based on the instructions 26 stored in the instruction register 28. The multi-bit overdrive signal 30 is also created by the computer's graphics section and is similar to the conventional digital pixel signal dpxl 15. The graphics section necessarily already has the data regarding what type of window is being displayed, i.e., for each pixel, in what type of window is the pixel used. Also, these data are already synchronized necessarily to the conventional digital pixel signal dpxl 15 and simply need to be brought out of the graphics section properly clocked, to the DAC section, to create the overdrive signal 30.

Figure 2:
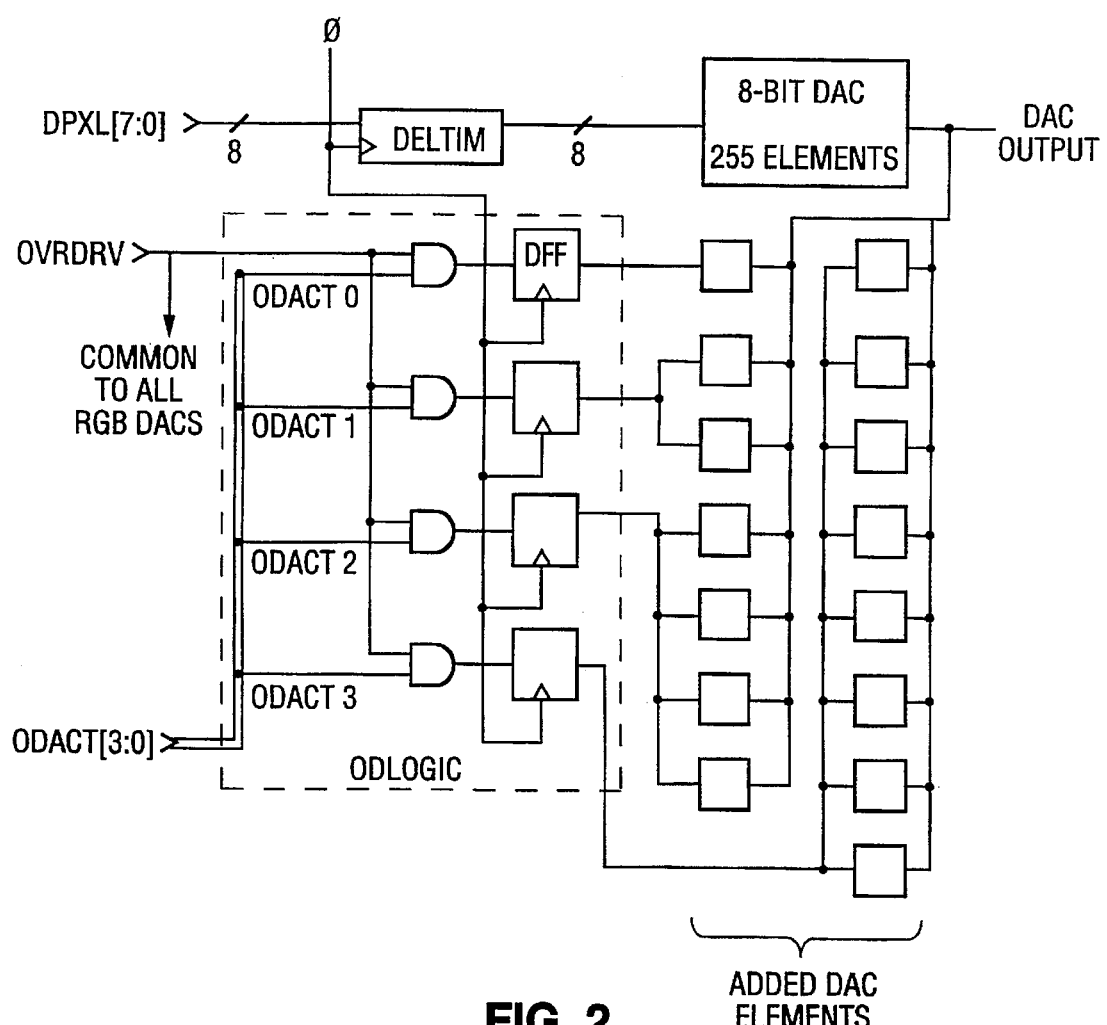
FIG. 2 is a schematic diagram illustrating an embodiment of a display control circuit in accordance with the present invention.

In the embodiment of the invention shown in FIG. 2, a single-bit overdrive signal ovrdrv, synchronous to the other DAC inputs and common to the three video DACs, is used on a window basis to enable the added DAC elements. In the FIG. 2 circuit, the number of DAC elements that respond to the overdrive signal is determined by the odact [3:0] inputs. These four odact [3:0] bits are stored in a register or other device. Each of the three RGB video DACs has an independent odact [3:0] register associated with it to allow each individual video DAC to increase its output intensity by a different amount in response to the overdrive signal. Thus, only one high speed pixel-rate bit is needed.

The FIG. 2 embodiment provides a continuous extension of the video DAC intensity by zero to fifteen single-step values. If this is not sufficient, then sixteen more DAC elements and one more bit of odact control signal could be added, and so on. Still, only one bit of high speed overdrive control signal ovrdrv is needed.

It should be noted that the added DAC elements need not be of uniform strength. By choosing the size and number of the added DAC elements, the number of odact bits and how these bits control the added DAC elements through the design of the ODLOGIC logic block, a wide variety of non-linear enhancements of intensity can be implemented.

It should also be noted that, in the event that the video window is over-saturated, or if for any other reason, it is desirable to reduce, rather than enhance, the brightness of the video windows, a XOR or other circuit can be added in series with the ovrdrv signal so that the sense of the signal can be inverted. In this manner, the video windows can be dimmed relative to the other windows on the screen. The signal to invert the ovrdrv signal can come from the CPU control bus or from another source.

Figure 3:
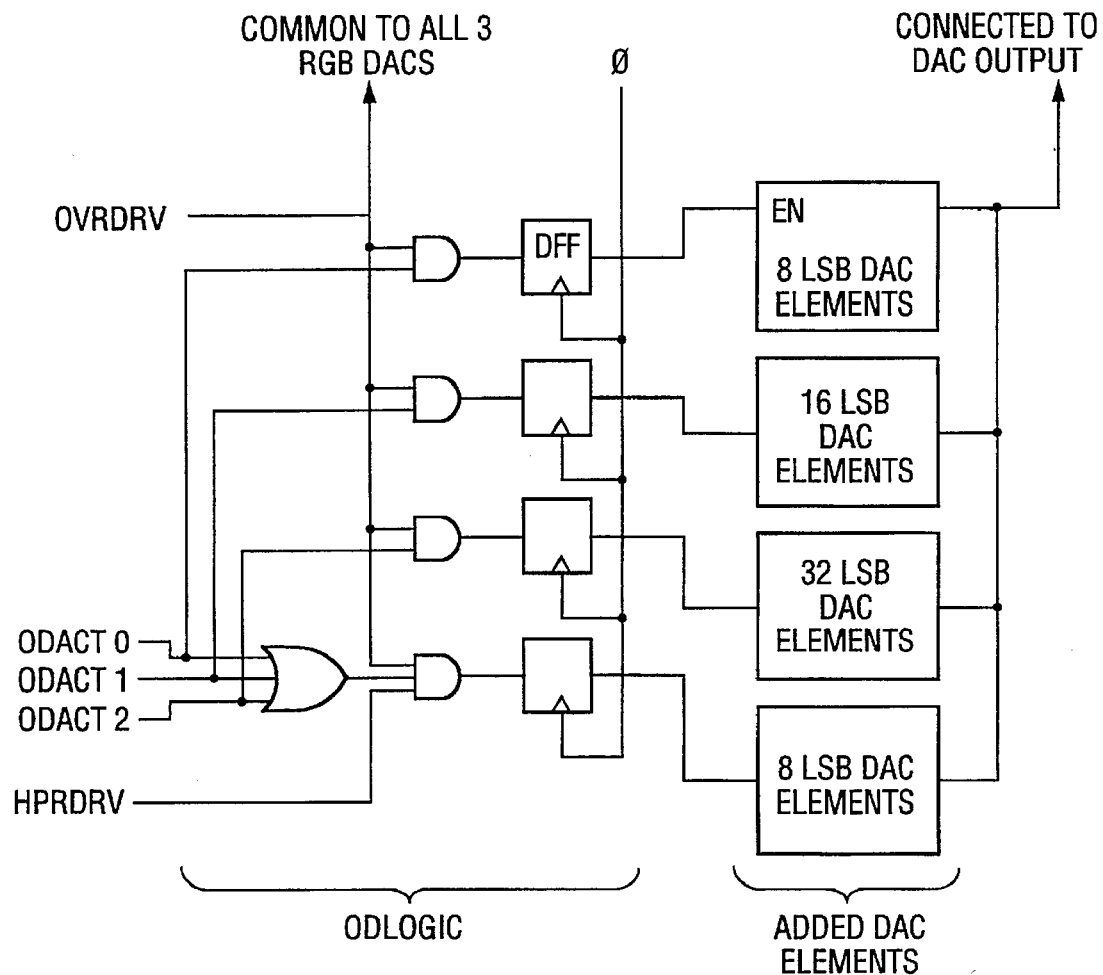
FIG. 3 is a schematic diagram illustrating an embodiment of a display control circuit in accordance with the invention with a "minimum differential."

In another embodiment of the invention, shown in FIG. 3, one bit of the stored odact control signal, the hyperdrive "hprdrv" bit, is "always" on to make one element always respond to the overdrive signal. This one element may be one single-step value or larger and is intended to provide a minimum boost of the video DAC output intensity in the video windows so that brightness is noticeably greater in those windows. The three other bits of odact control can then be used to activate other elements.

In the FIG. 3 embodiment, each added DAC element is eight single-step, or "lsb," values. Thus, 8 to 64 lsbs can be added to the video DAC output in the video window(s), in 8-lsb steps. Eight different settings are possible for enhancing each video DAC. If the element controlled by the hyperdrive signal is 16 lsbs, then 16 to 72 lsbs could be added to the video DAC output in the video window(s), in 8-lsb steps. The hyperdrive element can be made any size to allow any desired minimum enhancement.

FIG. 4 shows the video DAC behavior for the FIG. 3 embodiment. Note that if the hyperdrive control is off, then the values are 0 to 56; zero if odact=0. Only seven enhanced levels are available, not eight, as with hprdrv=1. If desired, the hyperdrive signal can be eliminated and the minimum offset element permanently activated to be enabled by the pixel-rate overdrive signal.

In the embodiments of the invention discussed above, only one "alternate window" brightness and tint level is available. This allows the display to have "normal" windows, where the synchronous signal does not enable the added DAC elements, and "enhanced" windows, where the synchronous signal is enabling. All video windows use the one available setting of elevated DAC outputs. While this setting can be adjusted with the odact controls, all "enhanced" windows are the same.

It may be desirable to have several windows, each having a different setting for brightness and tint, different from each other, as well as being above those "normal" windows without enhancement of brightness and tint. FIG. 5 illustrates one such embodiment of the invention. The one-bit "ovrdrv" synchronous pixel-rate signal utilized in the above-described embodiments has been replaced by a two-bit pixel-rate signal in the FIG. 5 embodiment. This allows three enhanced levels of brightness and tint to be set. Different video windows can use different of these settings.

In the implementation shown in FIG. 5, when both bits of the ovrdrv[1:0] signal are low, as for desktop graphics windows, the added DAC elements are not enabled and there is no enhancement. For windows where the ovrdrv[1:0] signal equals 01, two added DAC elements are enabled, and all pixels in that window are elevated by the offset current of those two elements. For ovrdrv[1:0]=10, four added DAC elements are enabled; and for ovrdrv[1:0]=11, seven added DAC elements are enabled. By adjusting the setting for the odact control, other choices for the settings of the three enhanced levels can be made. Any window can use any of these offset settings for all the pixels in that window.

Furthermore, the stored instructions represented by "odact" control signal can be eliminated. Sufficient bits of "ovrdrv" are then provided in a pixel-rate synchronous bus. The added DAC elements in each of the RGB video DACs are then enabled on a pixel-by-pixel basis at will and maximum use of the structure of the added DAC elements is made to provide different levels of brightness and tint enhancement for any window desired. This embodiment of the invention is illustrated in FIG. 6. The FIG. 6 circuit is similar to that of FIG. 3. In the FIG. 6 circuit, however, the controls are all pixel-rate and the desired DAC output enhancements are simply activated by the nine [r,g,b]ovrdrv [2:0] bits. Conceptually, this requires the generation of the most bits of added pixel data. As shown in FIG. 6, separate bits are needed for each DAC if tint control is desired.

It should be noted that a user interface device, such as a slider bar, can be provided to facilitate user implemented variations in brightness and tint "on the fly"; the incorporation of such an interface device into the above-described embodiments of the invention would be well within the capabilities of one skilled in the art.

It should be understood that various alternatives to the embodiments of the invention described herein may be employed in practicing the invention. It is intended that the following claims define the scope of the invention and that methods and circuits within the scope of these claims and their equivalents be covered thereby.

What is claimed is:

1. In a visual display system that includes a display monitor that provides a visual display and a plurality of video digital-to-analog converter networks, each video digital-to-analog converter (DAC) network having an output connected to a corresponding control input of the display monitor and being responsive to a digital pixel control input signal that determines the value of a current output signal provided by said video DAC network to the control input for each pixel of the visual display, the improvement comprising, for each video DAC network, a display control circuit for controlling brightness in a selected window of the visual display, the display control circuit comprising:

an added DAC network that responds to an enabling control signal by providing a supplemental current output signal to the monitor control input connected to receive the current output signal from the associated video DAC network;

an instruction storage register that stores instruction data that define the value of the supplemental current output signal;

a logic block that responds to the instruction data provided by the instruction storage register by generating an enabling control signal that causes the added DAC network to provide the supplemental current output signal, the logic block being enabled to provide the enabling control signal by a window-dependent overdrive input signal that is synchronous to the digital pixel control input signal and that defines the selected window of the visual display.

2. A visual display system as in claim 1 and wherein each of the display control circuits is individually controlled such that the added DAC networks are independently enabled whereby a selected window on the display can have different tint than another window on the display.

3. A visual display system as in claim 1 wherein the overdrive input signal is a multi-bit signal.

4. A visual display system as in claim 1 wherein the overdrive input signal is a single-bit signal that is common to each of the display control circuits in the system and wherein each of the display control circuits has an independent instruction storage register associated therewith whereby to allow each individual video DAC to increase its output intensity by a different amount in response to the single-bit overdrive input signal whereby a selected window on the display can have different tint than another window on the display.

5. A visual display system as in claim 4 wherein the instruction data stored in the instruction storage register is multi-bit data, and at least one bit of the multi-bit data defines the value of the supplemental current signal to be greater than zero.

6. A visual display system as in claim 1 wherein the overdrive input signal is a multi-bit signal that is common to each of the display control circuits in the system and wherein each of the display control circuits has an independent instruction storage register associated therewith whereby to allow multiple enhanced levels of brightness in different selected windows of the visual display.

7. A visual display system as in claim 1 and further comprising a user interface device connected to each of the display control circuits for selectively varying the stored instruction data whereby user implemented variations in the supplemental current output signal can be performed on the fly.

8. A visual display system as in claim 1 and further comprising, for each video DAC, brightness reduction means connected in series with the overdrive input signal for inverting the overdrive input signal whereby the brightness of the selected window can be dimmed relative to other windows on the display.

9. A display control circuit for controlling brightness in a selected window of a visual display generated by a visual display system, the visual display system including a display monitor that provides the visual display and a plurality of video digital-to-analog converter networks, each video digital-to-analog converter (DAC) network having an output connected to a corresponding control input of the display monitor and responsive to a digital pixel control signal that determines the value of a current output signal provided by the video DAC network to the control input for each pixel of the video display, the display control circuit comprising:

an added DAC network that responds to an enabling control signal by providing a supplemental current output signal to the monitor control input connected to receive the current output signal from the associated video DAC network;

an instruction storage register that stores instruction data that define the value of the supplemental current output signal;

a logic block that responds to the instruction data provided by the instruction storage register by generating an enabling control signal that causes the added DAC network to provide the supplemental current output signal, the logic block being enabled to provide the enabling control signal by a window-dependent overdrive input signal that is synchronous to the digital pixel control input signal and that defines the selected window on the visual display.

10. A display control circuit as in claim 9 wherein the overdrive input signal is a multi-bit signal.

11. A display control circuit as in claim 9 wherein the overdrive input signal is a single-bit signal that is common to the display control circuit associated with each of the plurality of video DAC networks and wherein each of the display control circuits has an independent instruction storage register associated therewith whereby to allow each individual video DAC network to increase its output intensity by a different amount in response to the single-bit overdrive input signal.

12. A display control circuit as in claim 11 wherein the instruction data stored in the instruction storage register is multi-bit data, and at least one bit of the multi-bit data defines the current value of the supplemental current signal to be greater than zero.

13. A display control circuit as in claim 9 wherein the overdrive input signal is a multi-bit signal that is common to the display control circuit associated with each of the plurality of video DACs and wherein each of the plurality of display control circuits has an independent instruction storage register associated therewith whereby to allow multiple enhanced levels of brightness in different selected windows of the visual display.

14. A visual display control system for controlling the visual display of a RGB monitor having three input control ports, the visual display control system comprising:

three video digital-to-analog converter (DAC) networks, each of the three video DAC networks having an output connected to a corresponding one of the three input control ports of the RGB monitor, each of the video DAC networks being responsive to an n-bit digital input signal which changes in synchronism to provide an n-bit digital value for each pixel of the visual display, the video DAC network being responsive to the n-bit value by providing a corresponding current signal to the corresponding input control port of the RGB monitor;

three added DAC networks, each of the added DAC networks having an output connected to a corresponding one of the three input control ports of the RGB monitor, each of the added DAC networks being responsive to a multi-bit digital input signal, independent of and unrelated to the n-bit digital input signal, by providing a corresponding supplemental current signal to the corresponding input control port of the RGB monitor; and for each added DAC network, a logic block that, when enabled, responds to instruction data by providing a multi-bit digital input signal defined by the instruction data, the logic block being enabled by an overdrive signal that is in synchronism with the n-bit digital input signal and defines the pixels of a selected window on the display.

15. A visual display control system for controlling the visual display of a RGB monitor having three input control ports, the visual display control system comprising, for each of the three input control ports:

a video DAC network having an output connected to said input control port, the video DAC network being responsive to a multi-bit digital input signal which changes in synchronism to provide a multi-bit digital value for each pixel of the visual display, the video DAC network being responsive to the multi-bit digital value by providing a corresponding current signal to said input control port;

an added DAC network that includes a plurality of added DAC elements, each added DAC element having an output connected to said input control port, the added DAC network being responsive to a multi-bit enable signal, independent of and unrelated to the multi-bit digital input signal, that activates selected of the added DAC elements to provide a supplemental current signal to said input control port;

an instruction storage register that stores instruction data;

a logic block that is enabled by a single-bit overdrive signal that is in synchronism with the multi-bit digital input signal and that defines the pixels of a selected window of the visual display, wherein the logic block responds to the instruction data provided by the instruction storage register by providing a corresponding multi-bit enable signal.

16. A visual display control system as in claim 15 and wherein each of the instruction storage registers stores different instruction data whereby the supplemental current signal provided to each input control port is different from the supplemental current signal provided to the other two input control ports.

* * * * *